United States Patent [19]
Falk et al.

[11] Patent Number: 4,473,679
[45] Date of Patent: Sep. 25, 1984

[54] THERMOPLASTIC ACRYLIC ELASTOMERS

[75] Inventors: John C. Falk, Northbrook; Stamatios Mylonakis, Barrington; Donald A. Van Beek, Jr., Elmhurst, all of Ill.

[73] Assignee: Borg-Warner Chemicals, Inc., Parkersburg, W. Va.

[21] Appl. No.: 560,360

[22] Filed: Dec. 12, 1983

[51] Int. Cl.$^3$ .................. C08F 265/04; C08K 3/22
[52] U.S. Cl. .................. 524/432; 524/426; 524/427; 524/436; 525/63; 525/70; 525/284; 525/291; 525/293; 525/296; 525/301; 525/302; 525/309; 525/310; 525/316; 525/902
[58] Field of Search .............. 524/426, 427, 436, 434; 525/284, 291, 293, 296, 301, 302, 310, 316, 902

[56] References Cited
U.S. PATENT DOCUMENTS

| | | | |
|---|---|---|---|
| 3,265,765 | 8/1966 | Holden et al. | 260/876 |
| 3,502,745 | 3/1970 | Minton | 260/878 |
| 3,661,994 | 5/1972 | Hwa et al. | 260/879 |
| 3,944,631 | 3/1976 | Yu et al. | 260/881 |
| 3,971,835 | 7/1976 | Myers et al. | 260/876 R |
| 4,082,895 | 4/1978 | Backderf et al. | 428/412 |
| 4,145,380 | 3/1979 | Myers et al. | 260/879 |
| 4,306,039 | 12/1981 | Shah et al. | 525/205 |

*Primary Examiner*—Jacob Ziegler
*Attorney, Agent, or Firm*—Richard J. Schlott

[57] ABSTRACT

Thermoplastic core-shell compositions having a rigid core, a rubbery acrylic shell and transition layer intermediate between the core and shell layers and formed of the core and shell monomer components have excellent elastomeric properties. Although the rigid and rubbery components include interreactive functional monomers, the resulting elastomers remain thermally processable in extrusion and injection molding equipment.

9 Claims, No Drawings

THERMOPLASTIC ACRYLIC ELASTOMERS

BACKGROUND OF THE INVENTION

This invention relates to elastomers and more particularly to elastomeric compositions comprising a rigid copolymer and a rubbery copolymer and to a method for the preparation thereof. Still more particularly, this invention relates to elastomeric compositions having a core-shell structure prepared by a sequential polymerization process, said compositions comprising (a) a rigid copolymer core formed of at least one rigid monovinylidene monomer and a first copolymerizable functional monomer, said rigid copolymer having a glass transition temperature of greater than 20° C., (b) a rubbery copolymer outer layer or shell formed of at least one rubbery acrylic monomer and a second copolymerizable functional monomer, said rubbery copolymer having a glass transition temperature of less than about 0° C. and (c) a transition layer, intermediate between the core and outer shell, formed of a mixture of the core components and the outer shell components.

Conventional rubbers and synthetic elastomers are generally tacky, low strength gums which require vulcanizing in order to attain useful properties. The vulcanizing or curing process introduces a high degree of crosslinking which in turn insolubilizes these materials and renders them intractable. Cured rubbers are thus no longer thermoplastic and are not readily reprocessable. Thermoplastic hydrocarbon elastomers have recently been introduced which do not require vulcanizing to be useful. Unlike ordinary rubbers, compositions such as the sytrene-butadiene-styrene block copolymers disclosed in Holden, et al, U.S. Pat. No. 3,265,765, possess the necessary elastomeric properties without curing and are permanently thermoplastic and soluble. These and related thermoplastic block copolymers have found wide commercial acceptance in part because of their ready reprocessability. The method of their preparation, however, involves an anionic solution polymerization process which inherently is limited to use with a narrow spectrum of anionically polymerizable hydrocarbon monomers. Because such polymers are readily dissolved by low molecular weight hydrocarbons they do not exhibit good oil and solvent resistance. Additionally, these hydrocarbon elastomers are subject to other environmental attack and particularly to degradation by UV radiation because of the presence of ethylenic unsaturation and are unsuited for outdoor use without substantial stabilizing or further treatment.

Acrylic elastomers have long been known for their heat stability and resistance to oil. These materials are prepared from acrylic esters such as ethyl acrylate and butyl acrylate and must be thermally or chemically crosslinked to impart the necessary strength properties. Emulsion polymerization processes have been widely employed for the production of acrylic elastomers and methods for chemical crosslinking of these materials with difunctional monomers are well known. As with conventional elastomers, these materials are insoluble and difficult to reprocess after being cured. More recently, a thermoplastic acrylic elastomer has become known as was disclosed in Shah, et al, U.S. Pat. No. 4,306,039. These elastomers are blends of a rubbery acrylic copolymer containing an acidic functional monomer with a rigid polymer of an N-vinyl lactam. Although the resulting elastomers are said to be oil resistant, reprocessable thermoplastics, the compositions are limited to blends of acrylic rubbers with N-vinyl lactam polymers. Altering the balance of properties to reduce water sensitivity or change other physical characteristics by the incorporation of additional monomers is not readily achieved.

Elastomers having a core-shell structure have also been disclosed in the prior art. The term core-shell structure has become well-understood in the art as defining a layered particulate composition having a polymeric center or core surrounded and encapsulated by a shell or overcoat formed of a second polymeric material. Methods for the preparation of such core-shell particulate compositions are now well known in the art and include a variety of layered particulate materials having a core and one or more shell layers. For example, in U.S. Pat. No. 3,661,994, graft polymers formed by a sequential polymerization process are disclosed wherein a rigid, polymeric seed or core is surrounded by a graft polymerized rubber layer and, optionally, encapsulated with a graft polymerized rigid outer layer. It will be understood that the core-shell description of these particulate compositions is intended to describe the product of the polymerization process; fusion of the shell component occurs during thermal processing such that the core-shell nature of the product is no longer discernable. The resulting particulate materials are useful as reinforcers and impact modifiers for plastics. Similarly, in U.S. Pat. No. 3,502,745 an acrylic elastomer is prepared by sequentially graft polymerizing monomers to form an acrylic elastomer shell in the presence of and encapsulating a rigid, particulate cross-linked polymeric core. These elastomers may further include complementary reactive monomers in the rigid and rubbery layers that interact by a condensation reaction in a subsequent curing step to bond the layers and effect a further crosslinking of the rubbery layer. The resulting acrylic elastomers are thus cured during processing and are not truly reprocessable.

A thermoplastic composition having elastomeric properties which could be prepared by a low cost emulsion process from readily available monomers and which could be varied over a wide composition range to alter the balance of physical properties to meet varied end use requirements would thus be a substantial advance in the elastomer art.

SUMMARY OF THE INVENTION

This invention is a thermoplastic elastomeric composition comprising (a) a rigid copolymer core formed of at least one rigid monovinylidene monomer and a first copolymerizable functional monomer, said rigid copolymer having a glass transition temperature greater than 20° C., (b) a rubbery copolymer outer shell prepared in the presence of and at least partially encapsulating the preformed core copolymer, said shell formed of at least one rubbery acrylic monomer and a second copolymerizable functional monomer, said rubbery copolymer having a glass transition temperature of less than about 0° C., and (c) a transition layer intermediate between the core and outer shell formed of a mixture of the core and shell components. The copolymerizable functional monomers are monoethylenically-unsaturated monomers containing at least one reactive, non-vinylic functional radical, and the first and second copolymerizable monomers are selected to be interreactive through their respective functional radicals. The compositions of this invention are thermoplastic elastomers without being vulcanized or cured, thus remaining thermally reprocessable.

DETAILED DESCRIPTION OF THE INVENTION

The rigid copolymers useful in forming the particulate core copolymer in the compositions of this invention are copolymers of at least one rigid monovinylidene monomer and a first copolymerizable functional monomer. The term rigid is a misnomer when applied to monomers, and what is meant by the phrase rigid monovinylidene monomers are monomers that when polymerized will provide a rigid polymer having a glass transition temperature (Tg) greater than 20° C. and include vinyl aromatic monomers, acrylic monomers, and copolymerizable mixtures thereof. Examples of vinyl aromatic monomers are styrene, alpha methylstyrene, alkyl-substituted styrene monomers such as vinyl toluene and halogen-substituted styrene monomers such as chlorostyrene, bromostryrene, di- and tri-bromo styrene and the like, and illustrative of acrylic monomers are alkyl methacrylates including methyl methacrylate, butyl methacrylate, octyl methacrylate and the like, and the corresponding nitriles such as acrylonitrile, methacrylonitrile, haloacrylonitrile and the like. The core copolymer may further include a copolymerizable, non-rigid monovinylidene monomer such as for example an alkyl acrylate, a vinyl ether, a vinyl ester or the like in minor amounts insufficient to depress the Tg of the final rigid copolymer below 20° C.

The core copolymer further includes at least one copolymerizable functional monomer, defined as a monoethylenically unsaturated monomer containing at least one reactive, non-vinylic functional radical. The functional radical may be selected from the group consisting of epoxy radicals, carbonyl radicals such as carboxylic acid, carboxylic anhydride, carbonamide, N-substituted carbonamide, aldehyde, alkyl and aryl keto, and the like, hydroxyl radicals, thiol radicals, amino radicals, isocyanate radicals, alkoxyalkyl radicals, and the like. Examples of such functional monomers include glycidyl methacrylate, acrylic and methacrylic acids, maleic anhydride, maleimide, acrylamide, N-alkoxyalkyl acrylamides such as N-isobutoxymethyl acrylamide, N-hydroxymethyl acrylamide and the like, methyl vinyl ketone, acrolein, vinyl isocyanate, hydroxyalkyl acrylates such as 2-hydroxyethyl acrylate, 2-hydroxyethyl methacrylate and the like. Also included are mixtures of two or more such functional monomers.

The core copolymers may be varied over a wide composition range, however, for most purposes the copolymer will comprise from about 99.9 to about 95 wt% of at least one rigid monovinylic monomer and from about 0.1 to about 5 wt% of first copolymerizable functional monomer. The preferred core copolymers are copolymers of styrene, acrylonitrile and acrylic acid.

The rubbery copolymers useful as the shell copolymer in the compositions of this invention are copolymers of at least one rubbery acrylic monomer and a second copolymerizable functional monomer. The term rubbery acrylic monomers is intended to mean monomers that when polymerized will provide a rubbery polymer having a Tg below about 0° C. Illustrative of rubbery acrylic monomers are the alkyl acrylates including ethyl acrylate, butyl acrylate, 2-ethylhexyl acrylate, and the like. The rubbery copolymer may further include any of the rigid monovinylidene monomers set forth above such as for example styrene, acrylonitrile, methyl methacrylate and the like in amounts insufficient to raise the Tg of the final rubbery copolymer above about 0° C., which amount will lie in the range of from 0 to 100 parts by weight of rigid monovinylidene monomer per 100 parts by weight of rubbery monomer.

The shell copolymer further includes a second copolymerizable functional monomer, defined as a monoethylenically unsaturated monomer containing at least one reactive functional radical. The second functional monomer may be any of those defined hereinabove as useful for the preparation of the core copolymer including mixtures containing two or more such functional monomers, with the proviso that the reactive functional radical of said second functional monomer must be capable of reacting with the reactive functional radical of the first functional monomer contained in the core copolymer. In that sense, the reactive functional monomer contained within the core copolymer and the reactive functional monomer contained within the shell copolymer are complementary or interreactive. The shell copolymer may optionally further include a minor amount of a copolymerizable di- or trivinyl monomer such as a glycol diacrylate, divinylbenzene, trialkylcyanurate or the like to provide further grafting sites, as is widely practiced in the art.

The shell copolymer may be varied over a wide composition range, however, for most purposes the copolymer will comprise from about 99.9 to about 95 wt% of at least one rubbery monomer and from about 0.1 to about 5 wt% of second copolymerizable functional monomer. The preferred shell copolymers are copolymers of an alkyl acrylate and 2-hydroxyethyl methacrylate.

As was said, the transition layer will be a copolymer formed from a mixture of the rubbery shell copolymer components and the rigid core copolymer components. The thermoplastic elastomeric compositions of this invention may be varied widely in the proportion of rigid core copolymer component and rubbery shell copolymer component as well as in the proportion of each that will be incorporated into the transition layer. However, for most purposes the ratio of rigid copolymer component to rubbery shell copolymer component will lie in the range of from about 1:10 to about 1:1, i.e., the composition will be comprised of from about 10 to about 100 parts by weight of the rigid copolymer component per 100 parts by weight of the rubbery copolymer component. At ratios of less than about 1:10 the compositions will be low strength thermoplastic rubbery materials, while at ratios greater than about 1:1 the compositions tend to be too rigid and inelastic for most elastomer applications. It will be understood, however, that compositions having a ratio above or below this range may well have utility where good elastomeric properties are not important.

The proportion of rigid core, transition layer and rubbery shell in the final core-shell particle may also be varied over a wide range. However, in general the transition layer will comprise from about 20 to about 80 wt% of the total weight of the core-shell particle structure. At very low levels of transition layer, the resulting elastomer has low tensile properties and poor low temperature characteristics, while at very high proportions of transition layer, the elastomer loses rubbery character. While the proportion of transition layer will vary depending upon the ratio of rigid core copolymer to rubber shell copolymer employed, the preferred compositions will have from about 30 to about 70 wt% transition layer in the final core-shell particle structure.

The compositions of this invention are prepared by an emulsion process, and preferably by a sequential emulsion polymerization process in which as a first polymerization step the core copolymer is prepared in particulate form as a latex. The transition layer is then formed by adding the monomers of the core and shell copolymers to the latex simultaneously, and polymerizing under conditions designed to minimize the formation of new particles, thus surrounding and encapsulating or partially encapsulating the particles of rigid core copolymer with the mixed polymers forming the transition layer. Finally, the monomers of the shell copolymer component are added and polymerized to form the encapsulating outer shell.

The staged process is analogous to the seeded sequential emulsion processes long known and used in the art to prepare multi-layered or core-shell polymer particles comprising highly crosslinked rubber phases either surrounding or encapsulated by other cross-linked polymeric layers. Typical of such processes are those disclosed by Hwa, et al in U.S. Pat. No. 3,661,994 and by Minton, in U.S. Pat. No. 3,502,745. These sequential processes may be adapted to the preparation of the uncrosslinked and thermoplastic elastomeric compositions of this invention to provide the desired core-shell layered particles having a rigid core, a mixed transition layer and a rubbery outer shell.

Although the thermoplastic elastomer compositions of this invention will preferably be directly prepared from the monomers by a sequential emulsion polymerization process, alternatively the requisite reactive functionality may be introduced by a post-reaction. For example, a controlled partial hydrolysis of an acrylate ester polymer such as a methyl methacrylate-styrene copolymer may be employed to provide a rigid core copolymer having carboxylic acid radicals. Similarly, equivalent polymers could be obtained by hydrolysis of styrene-vinyl acetate or styrene-maleic anhydride copolymers to provide rigid core copolymers having pendant hydroxyl or carboxylic acid radicals. Oxidation and epoxidation of ethylenically-unsaturated polymers may also be employed to introduce reactive hydroxyl, carboxylic or epoxy functionality. Rigid core copolymers may also be prepared by other methods and converted to the emulsion form for subsequent use in grafting by processes well known in the art.

The thermoplastic compositions of this invention thus comprise a particulate core formed of rigid core copolymer components, an outer shell formed of rubbery shell copolymer components and a transition layer intermediate between the core and outer shell, formed of a mixture of the core copolymer components and the shell copolymer components. The rigid core copolymer, the transition layer copolymers and the rubbery shell copolymer are capable of forming further bonds in a reaction between their respective functional radicals. The relative proportion of functional monomer present in each phase and the ease with which they interreact will affect the degree of linking and in turn may affect the reprocessability of the compositions. The optimum or most favorable functional monomer content will depend in part upon the particular end use requirement for ready moldability and reprocessability and will necessarily be determined for each particular combination of interreactive or complementary functional monomers by experiment. Thus, although functional monomer levels as great as 20 wt% may in some combinations produce thermally processable compositions, where higher degrees of processability and reprocessability are required, functional monomer levels of less than 5 wt% will be preferred.

The linking reaction will preferably take place after preparation of the core-shell structure, such as for example under the conditions encountered during a conventional melt-compounding or thermal processing step, i.e. during extrusion, milling or molding of the thermoplastic elastomeric composition.

It will be understood by those skilled in the art that although the compositions of this invention will be useful in the production of molded and extruded articles without further compounding, as a practical matter these compositions will normally be further compounded with stabilizers, fillers, pigments, dyes, extenders, lubricants and processing aids for use in particular applications. For example, it has been found that compounding the compositions of this invention with a minor amount of a metal oxide or carbonate, such as with from 0.1 to 1.0 wt% of zinc oxide, calcium oxide, sodium carbonate or the like, improves the extrusion and molding characteristics of these compositions. The use of these and similar processing aids will be familiar to those skilled in the rubber compounding art. The compositions of this invention will also be useful as impact modifiers for a wide variety of thermoplastic resins, including polystyrene, sytrene-acrylonitrile resins, vinyl resins, polyethers, polyesters, and the like.

The preparation of the thermoplastic elastomer compositions of this invention will be better understood by consideration of the following examples which are provided by way of illustration and not in limitation thereof.

In presenting the Examples, the following terms and abbreviations are used:

S-AN = styrene-acrylonitrile monomers, employed in the ratio of 2.8/1 (S/AN) unless otherwise indicated AA = acrylic acid monomer BA = butylacrylate monomer HEMA = 2-hydroxyethyl methacrylate monomer EHA = 2-ethylhexyl methacrylate monomer Tensile Str = tensile strength, ASTM D638

E = elongation, ASTM D638

El. Rec. = elastic recovery, determined as % recovery in 60 min. after 100% extension Hardness = shore hardness, ASTM D2240; A range unless otherwise noted.

Vol. Swell = volume swell after exposure to reference solvent for 24 hrs. at 68° F. (room temperature)

EXAMPLE 1

Preparation by Sequential Polymerization

The following reaction mixtures were prepared, degassed, and stored under nitrogen prior to polymerization:

| initiator solution | |
|---|---|
| Sodium peroxydisulfate | 6.0 g. |
| Water | 200 |
| rigid monomer emulsion | |
| Styrene | 349.6 g. |
| Acrylonitrile | 124.9 |
| Acrylic Acid | 13.0 |
| rubbery monomer emulsion | |

-continued

| | |
|---|---|
| Butyl acrylate | 786.5 g. |
| 2-hydroxyethyl methacrylate | 26.0 |
| Water | 656 |
| OT-100 | 15.6 |

A 5 l. polymerization reactor was charged with a mixture of 1350 g of water, 3.0 g. of sodium carbonate and 1.4 g. of DS-4 (sodium dodecyl benzene sulfonate, 23% aqueous). The mixture was stirred under a nitrogen atmosphere and heated to 80° C., then 97.5 of the rigid monomer emulsion was added, followed by 100 ml of the initiator solution. After stirring at 250 rmp and 80° C. for 30 min., an additional 146.3 g. of the rigid monomer emulsion was added over a 10 min. period, and the stirred mixture was heated at 80° C. an additional 10 min., to complete the formulation of the particulate core copolymer latex. The remaining rigid copolymer mixture (243.7 g.), together with ½ the rubbery monomer emulsion were added simultaneously over a 60 min. period. The balance of the rubbery monomer emulsion was then added over an additional 60 min. period. The balance of the initiator mixture was added continually with the rubbery monomer emulsion. The temperature was maintained at 80° C. throughout the addition of the monomer emulsions and then raised to 85° C. for an additional 60 min. before the kettle was cooled to 65° C. A "chaser" mixture of 1 ml of 75% t-butyl peroxy pivalate, 5.2 ml of 5% sodium formaldehyde sulfoxylate and 5 ml of water may be added at this point to reduce the unreacted monomer levels.

The cooled latex was filtered, then coagulated by slowly stirring into 4 volumes of dilute aqueous aluminum sulfate. The solid polymer was then collected by centrifugation, washed with water and dried overnight at 40°-50° C. in a vacuum oven. The composition is a core-shell composition having 18.8% core of a rigid core copolymer of 97.3 wt% styrene and acrylonitrile as monovinylidene monomers and 2.7 wt% acrylic acid as the first functional monomer, and 30.2% of a rubbery shell copolymer of 96.8 wt% butyl acrylate as the rubbery monomer and 2 wt% of 2-hydroxyethyl methacrylate as the second functional monomer. The intermediate or transition layer comprises 50.3 wt% of the structure, and is a mixture of the styrene, acrylonitrile and acrylic acid rigid core monomer components and the butylacrylate and 2-hydroxyethyl methacrylate rubbery shell monomer components. The ratio of rigid copolymer components to rubbery copolymer components is 1:1.67, corresponding to 60 pbw rigid components per 100 pbw rubber components in the composition.

EXAMPLES 2-8

SAN-Butylacrylate Elastomers

Compositions having varying levels of the rubbery copolymer component were prepared substantially by the process set forth in Example 1 by varying the rigid and rubbery monomer levels as well as the functional monomer content and proportion of intermediate layer. Control Examples A-F were prepared substantially by the process set forth in Example 1, but omitting a particular layer or layers or the functional monomers.

The various compositions were compounded with from 0.1 to 0.5 pbw zinc oxide per hundred parts of the elastomer, milled at room temperature, sheeted out and cut into strips. The milled strips were then fed to a Brabender ¾ in. extruder and extruded using barrel and die temperatures in the range 320°-340° F. The chopped extrudate was injection molded in a Battenfeld 1½ oz. screw injection molding machine using barrel and nozzle temperatures in the range 300°-350° F. and a mold temperature of 80°-90° F. to provide test specimens.

TABLE I

| Example No: | 1 | 2 | 3 | 4 | 5 | 6 | 7 | 8 |
|---|---|---|---|---|---|---|---|---|
| Rigid Monomers, pbw | 60 | 60 | 60 | 60 | 60 | 60 | 60 | 60 |
| S-AN, wt % | 97.3 | 97.3 | 96 | 96 | 99.2 | 97.3 | 96.0 | 94.7 |
| AA, wt % | 2.7 | 2.7 | 4 | 4 | 0.8 | 2.7 | 4.0 | 5.3 |
| Rubbery Monomers, pbw | 100 | 100 | 100 | 100 | 100 | 100 | 100 | 100 |
| BA, wt % | 96.8 | 96.8 | 95.2 | 95.2 | 99 | 96.8 | 95.2 | 93.6 |
| HEMA, wt % | 3.2 | 3.2 | 4.8 | 4.8 | 1.0 | 3.2 | 4.8 | 6.4 |
| Core, wt % | 18.8 | 22.5 | 22.5 | 28 | 15 | 15 | 15 | 22.5 |
| Transition wt % | 50 | 40 | 40 | 25 | 69.5 | 69.5 | 69.5 | 40 |
| Shell, wt % | 31.2 | 37.5 | 37.5 | 47 | 16.5 | 16.5 | 16.5 | 37.5 |
| Tensile Str, psi | 740 | 370 | 750 | 310 | 410 | 700 | 700 | 820 |
| E, % | 200 | 190 | 230 | 100 | 340 | 220 | 220 | 120 |
| El. Rec. % | 85 | 89 | 85 | 90 | — | 91 | 93 | 90 |
| Brittle Pt. °C. ASTM D756 | −39 | −49 | −43 | — | — | — | — | — |
| Hardness | | | | | | | | |
| Shore A | 70 | 60 | 70 | 65 | 50 | 70 | 65 | 70 |
| Vol Swell % | | | | | | | | |
| ASTM #3 | 1.8 | 3.1 | 1.8 | 3.1 | 1.1 | 1.4 | 2.1 | 1.6 |
| Fuel A | 10.1 | 20.7 | 8.5 | 25.6 | 6.2 | 4.8 | 8.4 | 5 |
| Fuel B | 170 | 146 | 154 | fail | 132 | 137 | 89 | 66 |

TABLE IA

| Example No: | A | B | C | D | E | F |
|---|---|---|---|---|---|---|
| Rigid Monomers, pbw | 60 | 60 | 60 | 60 | 60 | 60 |
| S-AN, wt % | 97.3 | 97.3 | 97.3 | 97.3 | 97.3 | 100 |
| AA, wt % | 2.7 | 2.7 | 2.7 | 2.7 | 2.7 | 0 |
| Rubbery Monomers, pbw | 100 | 100 | 100 | 100 | 100 | 100 |
| BA, wt % | 96.8 | 96.8 | 96.8 | 96.8 | 96.8 | 100 |
| HEMA, wt % | 3.2 | 3.2 | 3.2 | 3.2 | 3.2 | 0 |
| Core, wt % | 7.5 | 0 | 37.5 | 0 | 0 | 5 |
| Transition, wt % | 92.5 | 100 | 0 | 62.5 | 50 | 89.5 |
| Shell, wt % | 0 | 0 | 62.5 | 37.5 | 50 | 6.5 |

TABLE IA-continued

| Example No: | A | B | C | D | E | F |
|---|---|---|---|---|---|---|
| Tensile Str, psi | 800 | 620 | 190 | 1140 | 640 | 380 |
| E, % | 220 | 260 | 240 | 130 | 50 | 410 |
| El. Rec. % | 91 | 90 | 95 | Fail | Fail | 88 |
| Brittle Pt. °C. ASTM D756 | −10 | −3 | −47 | −37 | −48 | — |
| Hardness | | | | | | |
| Shore A | 65 | 60 | 40 | 41D | 87 | 55 |
| Vol Swell % | | | | | | |
| ASTM #3 | 1.0 | 0.6 | 4.7 | 3.1 | 5.1 | 1.3 |
| Fuel A | 2.8 | 1.8 | 34 | 12.8 | 19.5 | 6.2 |
| Fuel B | 104 | 63 | 253 | 168 | 256 | 76 |

It will be apparent from a consideration of the Examples of Table I and by comparison with the Control Examples of Table IA that the compositions of this invention exhibit desirable and useful properties. That the presence of a core layer, a shell layer and a transition layer is essential to attaining good elastomeric properties will be seen by a comparison of Examples 1 and 2 with Control Examples A-E having equivalent overall compositions. Omitting the shell layer (Control A), or the core and shell layers (Control B) results in an elevation in brittle point temperature, substantially limiting the low temperature properties of the elastomer. Additionally, omitting the transition layer (Control C) results in soft, low strength gum, while omitting the core layer (Controls D & E) provides a substantially less elastomeric product.

Within a given composition range, lowering the level of transition layer decreases the tensile strength of the resulting product. Compare Example 1 with 2 and Example 3 with 4. As will be seen by a comparison of Examples 2, 3 and 8 and of Examples 5-7, and Control F, at a given level of core, shell and transition layer, decreases in reactive monomer level tend to produce decreases in tensile strength, with minor increases in elongation. Without functional monomer, however, the product is a low strength gum (Control F).

EXAMPLES 9-13

In Examples 9-13, prepared substantially by the process of Example 1, the level of rigid monomers was varied. The formulations and physical properties are summarized in Table II.

TABLE II

| Example No: | 9 | 10 | 11 | 12 | 13 |
|---|---|---|---|---|---|
| Rigid Monomers, pbw | 30 | 55 | 65 | 70 | 80 |
| S-AN, wt % | 93.5 | 97.2 | 96.2 | 96.4 | 98.9 |
| AA, wt % | 6.5 | 2.8 | 3.8 | 3.6 | 1.1 |
| Rubbery Monomers, pbw | 100 | 100 | 100 | 100 | 100 |
| BA, wt % | 96.1 | 96.1 | 95 | 94.9 | 98.2 |
| HEMA, wt % | 3.9 | 3.9 | 5 | 5.1 | 1.8 |
| Core, wt % | 13.9 | 10.6 | 19.7 | 36.9 | 24.1 |
| Transition, wt % | 40 | 73.3 | 50 | 30.1 | 72.7 |
| Shell, wt % | 46.1 | 16.1 | 30.3 | 33.5 | 13.9 |
| Tensile Str, psi | 240 | 640 | 630 | 670 | 1040 |
| E, % | 160 | 220 | 210 | 190 | 240 |
| El. Rec. % | 95 | 92 | 92 | 80 | 72 |
| Hardness | | | | | |
| Shore A | 55 | 60 | 65 | 80 | 85 |
| Vol Swell % | | | | | |
| ASTM #3 | 5.1 | 1.8 | 4.2 | 4.2 | 0.9 |
| Fuel A | 34 | 6.6 | 15.7 | 15.5 | 2.8 |
| Fuel B | fail | 148 | 185 | fail | 79 |

It will be seen by consideration of the property data for Examples 9-13 that a wide variation in the level of rigid monomer component is possible without losing the desirable elastomeric characteristics. The levels of rigid monomer component, reactive monomer content and relative proportion of core, shell and transition layer may thus be selected over a wide range to provide the elasticity, hardness, tensile properties and solvent resistance properties desired for particular end-uses.

EXAMPLES 14-18

In Examples 14-18, prepared substantially by the process of Example 1, the composition of the rigid and rubbery monomers was varied. The compositions and their physical properties are summarized in Table III.

TABLE III

| Example No: | 14 | 15 | 16 | 17 | 18 |
|---|---|---|---|---|---|
| Rigid Monomers, pbw | 60 | 60 | 60 | 60 | 60 |
| S-AN, wt % | 96 | 97.3 | 96 | 0 | 96 |
| Styrene, wt % | 0 | 0 | 0 | 96 | 0 |
| AA, wt % | 4 | 2.3 | 4 | 4 | 4 |
| Rubbery Monomers, pbw | 100 | 100 | 100 | 100 | 100 |
| BA, wt % | 76.2 | 58.1 | 0 | 95.2 | 95.2 |
| EHA, wt % | 19.0 | 38.7 | 95.2 | 0 | 0 |
| HEMA, wt % | 4.8 | 3.2 | 4.8 | 4.8 | 4.8 |
| Core, wt % | 22.5 | 11.2 | 22.5 | 22.5 | 22.5 |
| Transition, wt % | 40 | 75.2 | 40 | 40 | 40 |
| Shell, wt % | 37.5 | 15.6 | 37.5 | 37.5 | 37.5 |
| Tensile Str, psi | 610 | 550 | 300 | 830 | 690 |
| E, % | 160 | 230 | 300 | 180 | 170 |
| El. Rec. % | 90 | 91 | 90 | 80 | 90 |
| Hardness | | | | | |
| Shore A | 65 | 65 | 50 | 78 | 70 |
| Vol Swell % | | | | | |
| ASTM #3 | 3.3 | 1.9 | 9.2 | 2.1 | 2.7 |
| Fuel A | 35 | 18 | 143 | 13 | 17 |
| Fuel B | fail | 252 | fail | fail | fail |

Although the Examples heretofore considered have employed only styrene and acrylonitrile as the rigid monomer components and butylacrylate as the rubbery monomer component, the teachings of this invention are applicable to a wider range of rubbery and rigid monomers. As will be seen from a consideration of Examples 14-18, summarized in Table III, further variation in the rubbery and rigid monomer components is possible while attaining useful elastomer compositions.

This invention will thus be seen to be a composition having a core-shell structure comprising (a) a rigid copolymer core formed of at least one rigid monovinylidene monomer and a first copolymerizable functional monomer, said rigid copolymer having a glass transition temperature greater than 20° C., (b) a rubbery copolymer outer shell formed of at least one rubbery acrylic monomer and a second copolymerizable functional monomer, said rubbery copolymer having a glass transition temperature of less than about 0° C., and (c) a transition layer formed of a mixture of the core and shell monomer components. The shell copolymer (b) surrounds and partially encapsulates the core copolymer (a), and the transition layer is intermediate between the core and shell components.

The compositions of this invention are useful as moldable and extrudable elastomers, and may be further compounded with pigments, processing aids, stabilizers, antioxidants, lubricants, fillers, plasticizers and the like as is commonly practiced in the rubber compounding art without departing from the scope of the invention. The compositions of this invention, though herein illustrated by way of specific examples, is limited in scope solely by the appended claims.

We claim:

1. A thermoplastic composition having a core-shell structure, wherein:
   (a) said composition comprises from 10 to 100 parts by weight of a rigid monomer mixture comprising from 99.9 to 95 wt% of at least one rigid monovinylic monomer and from 0.1 to 5 wt% of a first copolymerizable functional monomer, and 100 parts by weight of a rubbery monomer mixture comprising from 99.9 to 95 wt% of at least one rubbery acrylic monomer and from 0.1 to 5 wt% of a second copolymerizable functional monomer interreactive with said first functional monomer; and
   (b) said core-shell structure consists of from 10 to 40 wt% of a rigid polymeric core formed of said rigid monomer mixture, from 10 to 50 wt% of rubbery polymeric shell formed of said rubbery monomer mixture and surrounding and at least partially encapsulating said rigid polymeric core, and from 20 to 80 wt% of a copolymeric transition layer intermediate between said core and said shell and formed of said rigid monomer mixture and said rubbery monomer mixture.

2. The composition of claim 1 wherein said rigid monovinylic monomer is selected from the group consisting of vinyl aromatic monomers, acrylic monomers and mixtures thereof, and said rubbery acrylic monomer is an alkyl acrylate.

3. The composition of claim 1 wherein said first and second copolymerizable functional monomers are monoethylenically unsaturated monomers containing at least one reactive functional radical, said radical selected from the group consisting of epoxy radicals, carbonyl radicals, hydroxyl radicals, thiol radicals, amino radicals, isocyanate radicals, and alkoxyalkyl radicals.

4. The composition of claim 1 wherein said first and second copolymerizable functional monomers are selected from the group consisting of acrylic acids, acrylamides, N-alkoxyalkyl acrylamides and hydroxyalkyl acrylates.

5. The composition of claim 1 wherein said rigid monovinylic monomer is selected from the group consisting of styrene, alpha methylstyrene, acrylonitrile and mixtures thereof, said rubbery acrylic monomer is a $C_4$-$C_8$ alkyl acrylate, and said first and second copolymerizable functional monomers are selected from the group consisting of acrylic acids and hydroxyalkyl acrylates.

6. The composition of claim 1 further comprising from 0.1-1 wt% of a metal oxide.

7. A thermoplastic composition having a core-shell structure consisting of:
   (a) from 30 to 70 parts by weight of a rigid copolymer component comprising from 99.5 to 95 wt% of at least one rigid monovinylic monomer selected from the group consisting of styrene, alphamethyl styrene acrylonitrile and mixtures thereof and from 0.5 to 5.0 wt% of acrylic acid, and
   (b) 100 parts by weight of a rubbery copolymer component comprising from 98 to 96 wt% of a $C_4$-$C_8$ alkyl acrylate and from 2 to 4 wt% of hydroxyethyl methacrylate; wherein said core-shell structure consists of from 10 to 40 wt% rigid core, from 10 to 50 wt% rubbery shell and from 20 to 80 wt% of transition layer intermediate between said core and said shell, said transition layer consisting of a copolymer of said rigid monovinylic monomer, said acrylic acid, said $C_4$-$C_8$ alkyl acrylate and said hydroxyethyl methacrylate.

8. The composition of claim 7 further comprising from 0.1 to 1 wt% of zinc oxide.

9. The composition of claim 7 wherein the $C_4$-$C_8$ alkyl acrylate is butyl acrylate.

* * * * *